United States Patent [19]

Mizuta et al.

[11] Patent Number: 5,453,898
[45] Date of Patent: Sep. 26, 1995

[54] MAGNETIC DISK CARTRIDGE HAVING CENTER CORE SHAPED SO AS TO PREVENT STACKED CORES FROM BITING INTO ONE ANOTHER

[75] Inventors: Akira Mizuta; Nobuyuki Adachi, both of Kanagawa, Japan

[73] Assignee: Fuji Photo Film Co., Ltd., Kanagawa, Japan

[21] Appl. No.: 132,672

[22] Filed: Oct. 6, 1993

[30] Foreign Application Priority Data

Oct. 13, 1992 [JP] Japan .................... 4-077174 U

[51] Int. Cl.⁶ .................................................. G11B 23/03
[52] U.S. Cl. .................................................. 360/133
[58] Field of Search ............... 360/133, 99.04, 360/99.05

[56] References Cited

U.S. PATENT DOCUMENTS 4,654,733  3/1987  Kawakami et al. ............ 360/99.04

Primary Examiner—A. J. Heinz
Attorney, Agent, or Firm—Sughrue, Mion, Zinn, Macpeak & Seas

[57] ABSTRACT

A magnetic disk cartridge which prevents center cores from biting into each other when the cores are stacked during manufacture, and which can be produced at low cost with improved productivity. The center core includes an engagement hole formed in the central portion thereof, which includes a rising edge portion in the edge portion thereof. The height of the rising edge portion is determined in such a manner that, in order to prevent the flange inner peripheral corner portion and bottom outer peripheral corner portion of the center cores from contacting each other along the peripheries thereof when the cores are stacked, the rising edge portion of the engagement hole of one center core is allowed to contact the bottom surface portion 4b of the adjacent core. Also, the radius of curvature of the bottom outer peripheral corner portion is made greater than the radius of curvature of the flange inner peripheral corner portion.

8 Claims, 2 Drawing Sheets

MAGNETIC DISK CARTRIDGE HAVING CENTER CORE SHAPED SO AS TO PREVENT STACKED CORES FROM BITING INTO ONE ANOTHER

BACKGROUND OF THE INVENTION

The present invention relates to a magnetic disk cartridge and, more particularly, to a magnetic disk cartridge in which a center core fixed to the central portion of a magnetic disk is improved.

Conventionally, there has been widely used a magnetic disk cartridge a 3.5-inch micro floppy disk in which a magnetic disk is rotatably received in a cartridge case formed of a relatively hard material.

In the conventional magnetic disk cartridge, as shown in FIG. 4, there is provided a magnetic disk 1 and a center core 2 mounted to the central portion of the magnetic disk 1. The magnetic disk 1 is rotatably received in a cartridge case (not shown). The center core 2 is formed of a metal plate (a magnetic substance) having relatively good malleability. As shown in FIG. 5 (which is an enlarged section view taken along a line A—A in FIG. 4), the center core 2 includes a flange 2c provided in the outer peripheral portion thereof and two engagement holes 2a, 2b formed by drawing. The flange 2c is used to fix the core 2 to the magnetic disk 1 by means of an adhesive member 3 such as a double-sided tape or the like. When in use, a drive shaft D is inserted into one of the two engagement holes, namely, the engagement hole 2a (a cylindrical hole having a burred edge portion), which is formed in the center of the center core 2, while a positioning pin P is inserted into the other engagement hole 2b.

The flange 2c includes an inner peripheral corner portion 2d, while the center core 2 includes a bottom outer peripheral corner portion 2e. Due to the drawing machining process used to form them, the two corner portions 2d and 2d have a certain curvature. In manufacturing the magnetic disk cartridge, prior to final assembly, the drawn center core 2 can be stored and held in various conditions; for example, a large number of center cores are often stored in a case or the like before they are delivered for assembly with magnetic discs, or the center cores are stored in a hopper or the like forming a center core supply device provided in an automatic assembly facility.

In other words, the center cores 2 are sometimes stacked on each other. In some of the stacked center cores 2, for example, as shown in FIG. 6, there occurs a condition wherein, with the centers of the center cores coincident with each other, the center cores are vertically superimposed on each other. In such a superimposed state, in the portions of the center cores 2 designed by B in FIG. 6, the inner peripheral corner portion 2d and the bottom outer peripheral corner portion 2e can bite into each other due to manufacturing tolerances in the dimensions of the cores 2. If two or more center cores 2 are delivered in such a state, the center core delivery line may be stopped or other problems occur. In such an instance, such center cores 2 must be taken away from the delivery line and detached from each other by hand, then sent back again to the delivery line. This requires extra labor and time.

In order to eliminate the above inconvenience, for example, as disclosed in Japanese Utility Model Publication No. Hei. 2-16456, a center core is employed in which the metal plate of the center core is inserted into a synthetic resin member to thereby form the flange portion of the core plate as a resin portion, and the bottom surface (chucking surface) of the center core is made larger than the inner periphery of the flange, thereby to avoid the above-mentioned biting phenomenon.

However, in the above-mentioned conventional method, in addition to the step of forming the metal plate portion of the center core, there is added a step of inserting and molding the metal plate portion into a synthetic resin member, which increases the number of manufacturing steps. As a result, the productivity of the conventional method is lowered, while the costs of the center core are increased.

SUMMARY OF THE INVENTION

It is an object of the present invention to eliminate the above-mentioned problems of the conventional magnetic disk cartridge. That is, it is an object of the invention to provide a magnetic disk cartridge which avoids an increase in the number of manufacturing steps and difficulties in production, but which overcomes the center core biting problem.

To attain the above and other objects, according to the invention there is provided a magnetic disk cartridge including a center core having an outer peripheral flange onto which a magnetic disk sheet is to be bonded and also having an engagement hole for insertion of a drive shaft, which hole is formed in the center of a circular recessed portion formed by drawing the inner portion of the flange in one direction with a level difference, wherein the drive shaft engagement hole of the center core has an edge including in the hole edge thereof a rising edge portion which extends in the direction of the plane including the above flange, and also wherein the height of the rising edge portion is set in such a manner that the leading end portion of the rising edge portion of one of the superimposed center cores in a stack of cores contacts the outer surface of the circular recessed portion of the adjacent center core, thereby to prevent the inner peripheral corner portion of the flange and the bottom outer peripheral corner portion the circular recessed portion from contacting each other along the entire peripheries thereof.

Also, according to another aspect of the invention, there is provided a magnetic disk cartridge in which the radius of curvature of the bottom outer periphery corner portion of the center core is made greater than the radius of curvature of the inner periphery corner portion of the flange to thereby prevent the circular recessed portions from fitting into each other during production of the magnetic disk cartridge.

DESCRIPTION OF THE PREFERRED EMBODIMENTS

A description will be given below of the present invention with reference to preferred embodiments thereof depicted in the accompanying drawings.

Figure 1:
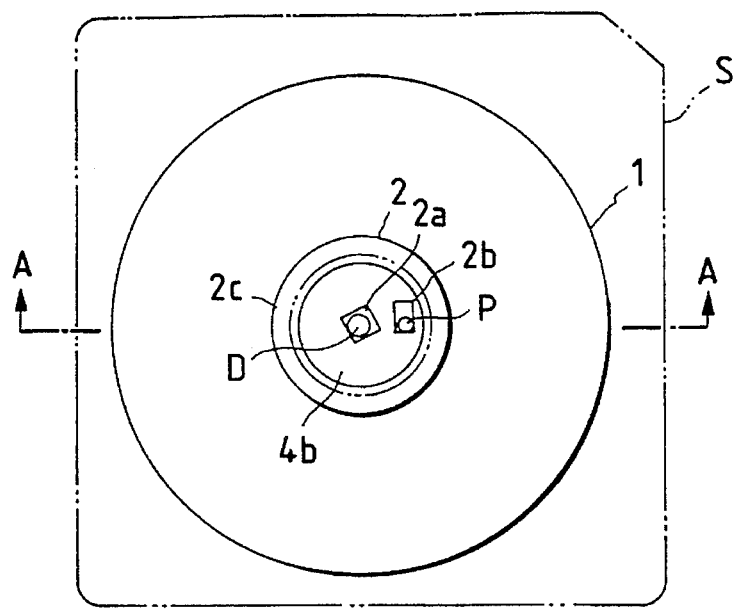
FIG. 1 is a plan view of an embodiment of a magnetic disk cartridge constructed according to the invention.
Figure 2:
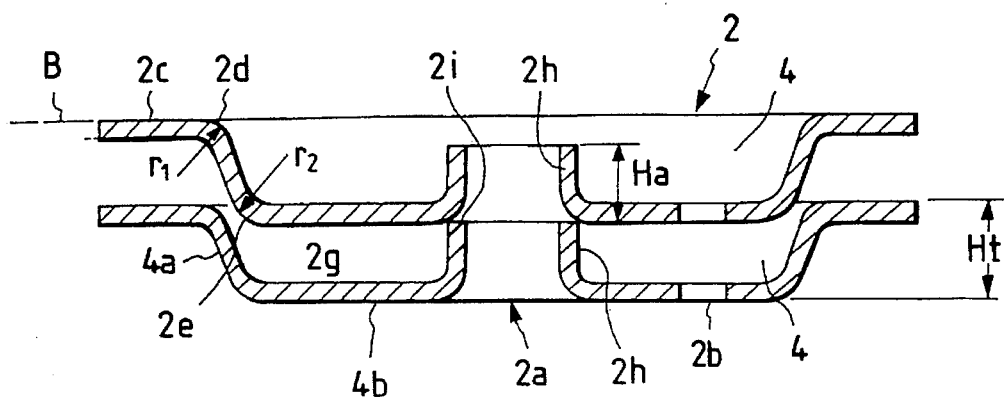
FIG. 2 is an enlarged section view taken along a line A—A of a center core part shown in FIG. 1.
Figure 3:
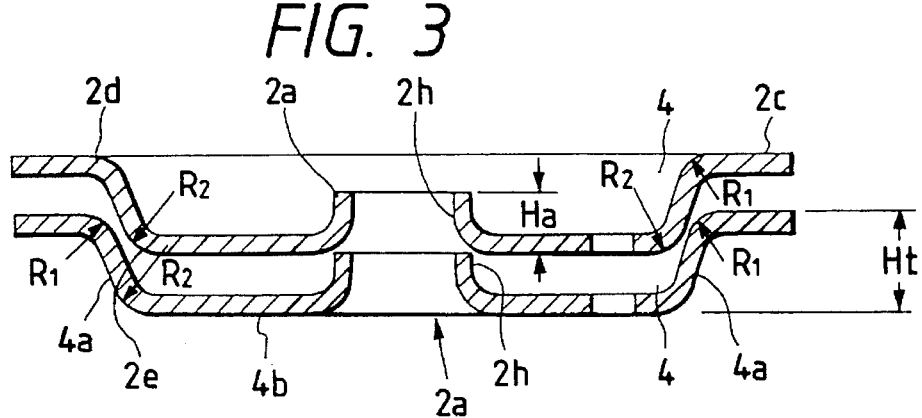
FIG. 3 is an enlarged section view, similar to FIG. 2, of another embodiment of the invention.
Figure 4:
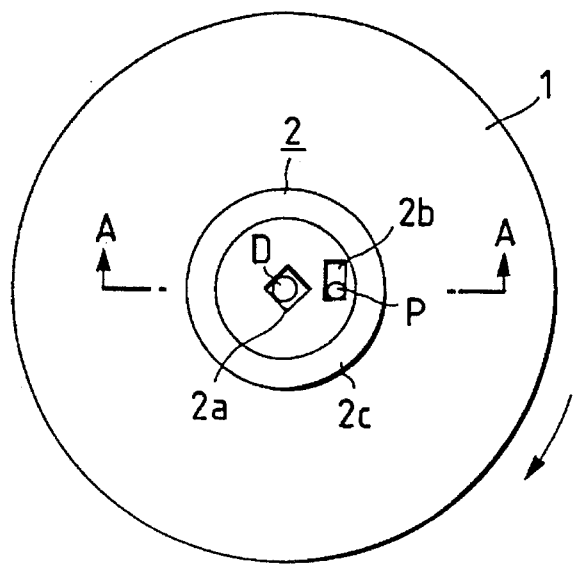
FIG. 4 is a plan view of a magnetic disk cartridge according to the prior art.
Figure 5:
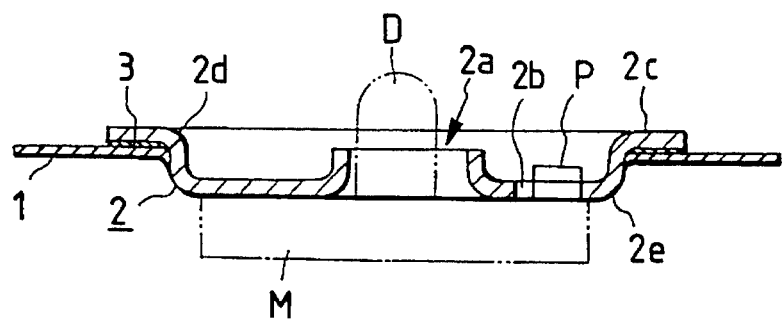
FIG. 5 is an enlarged section view taken along a line A—A of a center core part shown in FIG. 4.
Figure 6:
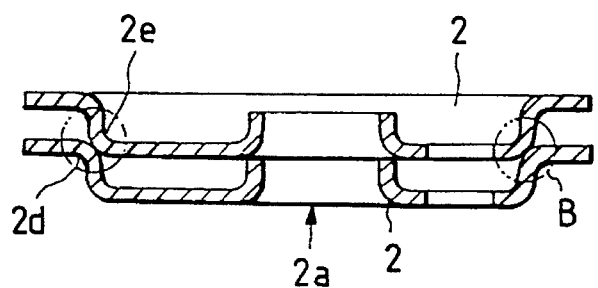
FIG. 6 is a sectional view of a conventional magnetic disk cartridge, showing a state in which the conventional center cores bite into each other.

In FIGS. 1 to 3, there is shown an embodiment of a magnetic disk cartridge constructed according to the invention. In particular, FIG. 1 is a general plan view of the cartridge, showing a state thereof in which a magnetic disk is disposed within a cassette shell S, and FIG. 2 is an enlarged section view taken along a line A—A in FIG. 1. In FIGS. 1 to 3, parts which are the same as the conventional ones shown in FIGS. 4 to 6 are given the same respective designations, and a further detailed description thereof is omitted.

Referring now to FIG. 1, a disk-shaped magnetic disk sheet 1, which includes a magnetic recording layer on a macromolecular film, is fixedly secured to the lower surface of a flange portion 2c of a center core 2 formed of a metal plate (a magnetic substance) by means of a double-sided tape 3 (see FIG. 5), and is assembled integrally with the center core 2, thereby forming a magnetic disk. The magnetic disk is rotatably received in the cassette shell S, with the bottom surface portion 4b of the center core exposed.

The center core 2 includes a circular recessed portion 4 formed by punching and drawing a metal plate (formed of a steel material such as SuS430, SuS431, DP1 or the like) having a high malleability. The center core 2 includes within the circular recessed portion 4 an elongated hole 2b into which a positioning pin P is to be inserted and an engagement hole 2a (defined by a drive shaft engagement portion) into which a drive shaft D is to be inserted.

The above-mentioned flange portion 2c of the center core 2 is formed on the outer periphery of the circular recessed portion 4. A rising edge portion 2h at the edge portion of the engagement hole 2a is formed by burring simultaneously with the drawing operation in such a manner that the rising edge portion 2h has a square section. The engagement hole 2a, as shown in FIG. 1, is formed in such a manner that the center line thereof intersects the longitudinal center line of the elongated hole 2b at a certain angle. The reason for this is that when the bottom surface of the center core 2 or a chucking surface 2g is attracted by a magnet M as shown in FIG. 5 and the magnetic disk is rotated, the drive shaft D and the pin P are pressed against the respective hole wall surfaces due to the centrifugal force of the magnetic disk and are thus kept at their respective contact positions, thereby to maintain constant the center of rotation of the magnetic disk.

In the present embodiment, the rising edge portion 2h of the center core 2 extends a height Ha in the direction of an imaginary plane B including the flange portion 2c. That is, the rising edge portion 2h is relatively higher than the corresponding portion in a conventional center core. Due to this feature, when two or more center cores are stacked together as shown in FIG. 2, the leading end 2i of the rising edge portion 2h of the lower center core contacts the outer surface of the circular recessed portion 4 of the upper center core 2 before the inner peripheral corner portion 2d of the flange portion 2c can contact the bottom outer peripheral portion 2e of the circular recessed portion 4.

In the above-described structure, due to the fact that the increased relative height of the rising edge portion 2h of the drive shaft engagement hole as shown in FIG. 2, the leading end 2i of the rising edge portion 2h of the lower center core 2 is allowed to contact the bottom surface portion 4b of the upper center core 2 to thereby produce a clearance between the bottom outer peripheral corner portion 2e of the upper center core 2 and the inner peripheral corner portion 2d of the lower center core 2. This eliminates the possibility of the two center cores biting into each other as in the conventional case.

Tests have shown that, when the total height Ht of the center core 2 is 1.70 to 1.80 mm, the radius of curvature $r_1$ of the inner peripheral corner portion 2d of the flange 2c, is 0.6 mm, and the radius of curvature $r_2$ of the outer peripheral corner portion 2d is 0.6 to 0.9 mm, if the height Ha of the rising edge portion 2a is 1.20 to 1.40 mm, then the corner portions 2d and 2e of the center core 2 are substantially prevented from contacting each other. In other words, this prevents the center cores from biting into each other.

Next, a description will be given of another embodiment of a magnetic disk cartridge according to the invention.

In this embodiment, as shown in FIG. 3, the height of the rising edge portion 2h is lower than that shown in FIG. 2, while the radius of curvature $r_2$ of the bottom outer peripheral corner portion 2e of the center core 2 is made greater than the radius of curvature $r_1$ of the inner peripheral corner portion 2d of the flange. In this structure, due to the fact that the radius of curvature $r_2$ of the bottom outer peripheral corner portion 2e is greater than the radius of curvature $r_1$ of the inner peripheral corner portion 2d, a portion extending between the side surface portion 4a and the bottom surface portion 4b of the circular recessed portion 4 provides a smoothly inclined structure. As a result, even if there occurs a condition where two or more circular recessed portions 4 are superimposed on each other, the smoothly inclined structure makes it difficult for the circular recessed portions to bite into each other. Also, even if the two corner portions do happen to contact each other at some portions thereof, the above-described biting phenomenon can be effectively prevented.

In another test, disc cartridges were produced in which the radius of curvature $r_2$ was less than the radius of curvature $r_1$. When the total height Ht of the center core 2 was 1.70 to 1.80 mm and the height of the rising edge portion 2a was 1.20 mm or less (for example, 1.15 to 1.00 mm), there increased a difference between the radius of curvature $r_1$ of the flange inner peripheral corner portion 2e such that $r_1$= 0.5 to 0.6 mm and $r_2$=1.0 to 1.1 mm. As a result, the possibility that the flange inner peripheral corner portion 2d could contact the bottom peripheral corner portion 2e was eliminated, that is, the two center cores 2 were allowed to contact each other at the rising edge portion end faces thereof, so that the two center cores 2 were prevented from biting into each other. In other words, as the difference between the values of $r_1$ and $r_2$ was increased, the effect of preventing the biting phenomenon became more pronounced.

As described heretofore, according to the invention, due to the fact that the height of the rising edge portion is determined such that, when the center cores are stacked together facing in the same direction, the rising edge portion end face of one center core is first contacts the bottom portion of the other center core, the center cores are prevented from biting into each other. Also, due to the fact that the radius of curvature of the bottom outer peripheral corner portion of the center core is greater than the radius of curvature of the flange inner peripheral corner portion, the center cores are prevented from biting into each other. As a result, no inconvenience can occur in a magnetic disk assembly line, so that the productivity of the magnetic disk cartridges can be enhanced. At the same time, there is eliminated the need for insert molding as is necessary in the conventional center core, so that the magnetic disk cartridge can be produced at a low cost, and also the productivity of the magnetic disk cartridge can be improved.

What is claimed is:

1. A magnetic disk cartridge comprising a magnetic disk sheet and a center core, said center core having an outer peripheral flange, a circular recessed portion inside said outer peripheral flange, a sloping side wall joining said outer peripheral flange through an outer peripheral corner portion and said circular recessed portion through an inner peripheral corner portion, and a drive shaft engagement portion having a drive shaft engagement hole formed therein, said drive shaft engagement portion being formed by drawing a center portion of said circular recessed portion in one direction, the improvement wherein a total height of said drive shaft engagement portion from a base end thereof on a side of said circular recessed portion opposite said peripheral flange to a hole edge portion of said drive shaft engagement portion on the same side of said circular recessed portion as said outer peripheral flange is such that, when a plurality of said cores are stacked together before attachment thereto of magnetic disk sheets, the hole edge portion of the drive shaft engagement portion of one core abuts the base end of the drive shaft engagement portion of an adjacent core while a gap is formed between said inner peripheral corner portion of said one core and said outer peripheral corner portion of said other core wherein a total height of said center core is between 1.7 and 1.8 mm and said total height of said drive shaft engagement portion is between 1.2 and 1.4 mm.

2. The magnetic disk cartridge as set forth in claim 1, wherein a radius of curvature of said outer peripheral corner portion is greater than a radius of curvature of said inner peripheral corner portion, thereby preventing said circular recessed portions of the stacked center cores from biting into each other.

3. The magnetic disk cartridge as set forth in claim 1, wherein a radius of curvature of said inner peripheral corner portion is approximately 0.6 mm, and a radius of curvature of said outer peripheral corner portion is in a range of 0.6 to 0.99 mm.

4. A magnetic disk cartridge comprising a magnetic disk sheet and a center core, said center core having an outer peripheral flange, a circular recessed portion inside said outer peripheral flange, a sloping side wall joining said outer peripheral flange through an outer peripheral corner portion and said circular recessed portion through an inner peripheral corner portion, and a drive shaft engagement portion having a drive shaft engagement hole formed therein, said drive shaft engagement portion being formed by drawing a center portion of said circular recessed portion in one direction, the improvement wherein a total height of said drive shaft engagement portion from a base end thereof on a side of said circular recessed portion opposite said peripheral flange to a hole edge portion of said drive shaft engagement portion on the same side of said circular recessed portion as said outer peripheral flange is such that, when a plurality of said cores are stacked together before attachment thereto of magnetic disk sheets, the hole edge portion of the drive shaft engagement portion of one core abuts the base end of the drive shaft engagement portion of an adjacent core while a gap is formed between said inner peripheral corner portion of said one core and said outer peripheral corner portion of said other core, wherein a total height of said center core is in a range of 1.70 to 1.80 mm, and said height of said drive shaft engagement portion is no more than 1.20 mm.

5. The magnetic disk cartridge according to claim 4, wherein said height of said drive shaft engagement portion is in a range of 1.00 to 1.15 mm.

6. The magnetic disk cartridge of claim 4, wherein a radius of curvature of said inner peripheral corner portion is in a range of 0.5 to 0.6 mm, and a radius of curvature of said outer peripheral corner portion is in a range of 1.0 to 1.1 mm.

7. A magnetic disk cartridge comprising a magnetic disk sheet and a center core, said center core having an outer peripheral flange, a circular recessed portion inside said outer peripheral flange, a sloping side wall joining said outer peripheral flange through an outer peripheral corner portion and said circular recessed portion through an inner peripheral corner portion, and a drive shaft engagement portion having a drive shaft engagement hole formed therein, said drive shaft engagement portion being formed by drawing a center portion of said circular recessed portion in one direction, the improvement wherein a total height of said drive shaft engagement portion from a base end thereof on a side of said circular recessed portion opposite said peripheral flange to a hole edge portion of said drive shaft engagement portion on the same side of said circular recessed portion as said outer peripheral flange is such that, when a plurality of said cores are stacked together before attachment thereto of magnetic disk sheets, the hole edge portion of the drive shaft engagement portion of one core abuts the base end of the drive shaft engagement portion of an adjacent core while a gap is formed between said inner peripheral corner portion of said one core and said outer peripheral corner portion of said other core, wherein a radius of curvature of said inner peripheral corner portion is in a range of 0.5 to 0.6 mm, and a radius of curvature of said outer peripheral corner portion is in a range of 1.0 to 1.1 mm.

8. A magnetic disk cartridge comprising a magnetic disk sheet and a center core, said center core having an outer peripheral flange, a circular recessed portion inside said outer peripheral flange, a sloping side wall joining said outer peripheral flange through an outer peripheral corner portion and said circular recessed portion through an inner peripheral corner portion, and a drive shaft engagement portion having a drive shaft engagement hole formed therein, said drive shaft engagement portion being formed by drawing a center portion of said circular recessed portion in one direction, the improvement wherein a total height of said drive shaft engagement portion from a base end thereof on a side of said circular recessed portion opposite said peripheral flange to a hole edge portion of said drive shaft engagement portion on the same side of said circular recessed portion as said outer peripheral flange is such that, when a plurality of said cores are stacked together before attachment thereto of magnetic disk sheets, the hole edge portion of the drive shaft engagement portion of one core abuts the base end of the drive shaft engagement portion of an adjacent core while a gap is formed between said inner peripheral corner portion of said one core and said outer peripheral corner portion of said other core, wherein a radius of curvature of said outer peripheral corner portion is greater than a radius of curvature of said inner peripheral corner portion, thereby preventing said circular recessed portions of the stacked center cores from biting into each other.

\* \* \* \* \*